United States Patent
Pan et al.

(10) Patent No.: US 11,334,723 B2
(45) Date of Patent: May 17, 2022

(54) METHOD AND DEVICE FOR PROCESSING UNTAGGED DATA, AND STORAGE MEDIUM

(71) Applicant: Beijing Xiaomi Intelligent Technology Co., Ltd., Beijing (CN)

(72) Inventors: Xiaotong Pan, Beijing (CN); Zuopeng Liu, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 256 days.

(21) Appl. No.: 16/686,141

(22) Filed: Nov. 16, 2019

(65) Prior Publication Data

US 2021/0019372 A1    Jan. 21, 2021

(30) Foreign Application Priority Data

Jul. 15, 2019 (CN) .......................... 201910637827.6

(51) Int. Cl.
*G06F 40/30* (2020.01)
*G06F 16/33* (2019.01)
(Continued)

(52) U.S. Cl.
CPC .......... *G06F 40/30* (2020.01); *G06F 16/3344* (2019.01); *G06F 16/3347* (2019.01);
(Continued)

(58) Field of Classification Search
CPC ........ G06N 20/00; G06N 3/08; G06N 3/0454; G06N 3/088; G06N 3/02; G10L 15/22;
(Continued)

(56) References Cited

U.S. PATENT DOCUMENTS

| 9,020,950 B2 * | 4/2015 | Janssen, Jr. ......... G06F 16/3338 |
| | | 707/742 |
| 2012/0036100 A1 * | 2/2012 | Probst ..................... G06F 40/20 |
| | | 706/48 |

(Continued)

FOREIGN PATENT DOCUMENTS

| CN | 108898225 A | 11/2018 |
| CN | 109902271 A | 6/2019 |

(Continued)

OTHER PUBLICATIONS

V. Jothi Prakash, Dr. L.M. Nithya, A Survey on Semi-Supervised Learning Techniques, Feb. 1, 2014(Feb. 1, 2014).

(Continued)

*Primary Examiner* — Linda Wong
(74) *Attorney, Agent, or Firm* — Syncoda LLC; Feng Ma

(57) ABSTRACT

A method for processing untagged data includes: similarity comparison is performed on a semantic vector of untagged data and a semantic vector of each piece of tagged data to obtain similarities corresponding to respective pieces of tagged data; a preset number of similarities are selected according to a preset selection rule; the untagged data is predicted with a tagging model obtained by training through the tagged data, to obtain a prediction result of the untagged data; and the untagged data is divided into untagged data that can be tagged by a device or untagged data that cannot be tagged by the device according to the preset number of similarities and the prediction result.

18 Claims, 8 Drawing Sheets

(51) Int. Cl.
  *G06F 16/36* (2019.01)
  *G06F 40/284* (2020.01)
  *G06K 9/62* (2022.01)
  *G06V 10/24* (2022.01)

(52) U.S. Cl.
  CPC ............ *G06F 16/36* (2019.01); *G06F 40/284* (2020.01); *G06K 9/6215* (2013.01); *G06V 10/242* (2022.01)

(58) Field of Classification Search
  CPC ....... G10L 15/26; G10L 15/063; G10L 15/16; G10L 15/18; G10L 13/00; G10L 13/027; G10L 13/047; G10L 17/04; G10L 17/18; G06F 16/248; G06F 16/3329; G06F 16/243; G06F 16/285; G06F 16/90332; G06F 40/20; G06F 40/279; G06F 11/30; G06F 16/2433; G06F 40/56
  See application file for complete search history.

(56) References Cited

U.S. PATENT DOCUMENTS

2014/0207439 A1   7/2014   Venkatapathy et al.
2018/0137433 A1*  5/2018   Devarakonda ......... G16H 10/20

FOREIGN PATENT DOCUMENTS

| CN | 109992763 A | | 7/2019 |
| CN | 111090753 B | * | 11/2020 |
| CN | 107247709 B | * | 3/2021 |
| EP | 2757487 A2 | | 7/2014 |
| WO | 2008037848 A1 | | 4/2008 |

OTHER PUBLICATIONS

Simon Tong, Active Learning: Theory and Applications, Aug. 2001(Aug. 2001).
Lan LIN, Research on Automatic Image Annotation Based on Semi-Supervised Learning, Jun. 2015(Jun. 2015).
Tomas Mikolov, etc., Distributed Representations of Words and Phrases and their Compositionality, Oct. 16, 2013 (Oct. 16, 2013).
Sepp Hochreiter, Jurgen Schmidhuber, Long Short-term Memory, mailed on Feb. 24, 1997.
Stephen Robertson, Understanding Inverse Document Frequency: On theoretical arguments for IDF, Jan. 31, 2016 (Jan. 31, 2016).
Stephen Robertson and Hugo Zaragoza, The Probabilistic Relevance Framework: BM25 and Beyond, mailed in 2009.
Supplementary European Search Report in the European application No. 19210346.3, dated Apr. 9, 2020.
First Office Action of the Chinese application No. 201910637827.6 dated Sep. 27, 2021.

* cited by examiner

METHOD AND DEVICE FOR PROCESSING UNTAGGED DATA, AND STORAGE MEDIUM

CROSS-REFERENCE TO RELATED APPLICATION

This application claims priority to Chinese patent application No. 201910637827.6, filed on Jul. 15, 2019, the disclosure of which is hereby incorporated by reference in its entirety.

BACKGROUND

In a question-answering system scenario, it may be needed to establish a relationship between a user query and a knowledge point, and train a semantic similarity model by use of the relationship between the user query and the knowledge point, and a question-answering effect may be improved by a semantic similarity model-based method. Tagged data in the form of "<user query>\t<knowledge point>" is required by the semantic similarity model. That is, a manual resource is required to tag the user query to establish the relationship between the user query and the knowledge point. The tagged data is configured to train a supervised model, and accumulation of the tagged data requires high human resource consumption.

SUMMARY

The present disclosure generally relates to a computer application technology, and more specifically to a method and device for processing untagged data, and a non-transitory storage medium.

According to a first aspect of embodiments of the present disclosure, there is provided a method for processing untagged data, the method including: similarity comparison is performed on a semantic vector of untagged data and a semantic vector of each piece of tagged data to obtain similarities corresponding to respective pieces of tagged data; a preset number of similarities are selected according to a preset selection rule; the untagged data is predicted by use of a tagging model obtained by training through the tagged data, to obtain a prediction result of the untagged data; and the untagged data is divided into untagged data that can be tagged by a device or untagged data that cannot be tagged by the device according to the preset number of similarities and the prediction result.

According to a second aspect of the embodiments of the present disclosure, there is provided a device for processing untagged data, including a processor, and a memory storing instructions executable by the processor. The processor is configured to: perform similarity comparison on a semantic vector of untagged data and a semantic vector of each piece of tagged data to obtain similarities corresponding to respective pieces of tagged data; select a preset number of similarities according to a preset selection rule; predict the untagged data by use of a tagging model obtained by training through the tagged data, to obtain a prediction result of the untagged data; and divide the untagged data into untagged data that can be tagged by a device or untagged data that cannot be tagged by the device according to the preset number of similarities and the prediction result.

According to a third aspect of the embodiments of the present disclosure, there is provided a non-transitory storage medium having stored thereon computer-readable instructions that, when executed by a processor, cause the processor to implement blocks of a method for processing untagged data, the method including: similarity comparison is performed on a semantic vector of untagged data and a semantic vector of each piece of tagged data to obtain similarities corresponding to respective pieces of tagged data; a preset number of similarities are selected according to a preset selection rule; the untagged data is predicted by use of a tagging model obtained by training through the tagged data, to obtain a prediction result of the untagged data; and the untagged data is divided into untagged data that can be tagged by a device or untagged data that cannot be tagged by the device according to the preset number of similarities and the prediction result.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
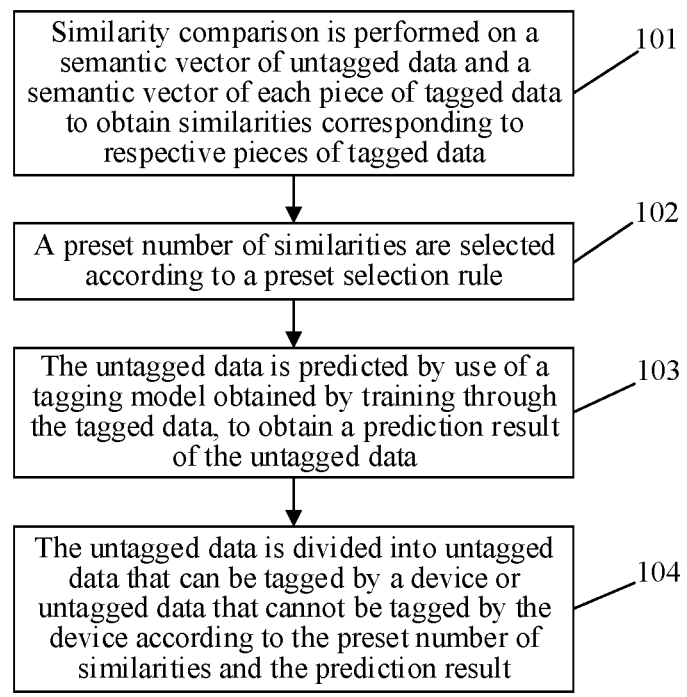
FIG. 1 is a flowchart illustrating a method for processing untagged data according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. "A/an," "said" and "the" in a singular form in the embodiments of the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the embodiments of the present disclosure, the information should not be limited to these terms. These terms are only adopted to distinguish the information of the same type. For example, without departing from the scope of the embodiments of the present disclosure, first information may also be called second information and, similarly, second information may also be called first information. For example, term "if" used here may be explained as "while" or "when" or "responsive to determining," which depends on the context.

The embodiments of the present disclosure disclose a method and device for processing untagged data and a non-transitory storage medium. Similarity comparison is performed on the semantic vector of the untagged data and the semantic vector of each piece of tagged data to obtain the similarities corresponding to respective pieces of tagged data; the preset number of similarities are selected according to the preset selection rule; the untagged data is predicted by use of the tagging model obtained by training through the tagged data, to obtain the prediction result of the untagged data; and the untagged data is divided into the untagged data that can be tagged by the device or the untagged data that cannot be tagged by the device according to the preset number of similarities and the prediction result. In this way, a direct correlation, i.e., the similarity, is established between the tagged data and the untagged data, and whether the untagged data can be tagged by the device or not is distinguished in combination with the prediction result, so that distinguishing accuracy is improved, and it is thus possible to reduce tagging errors caused by the fact that the data that cannot be tagged is tagged by the device.

Various embodiments of the disclosure can provide higher accuracy of distinguishing untagged data that can be tagged by a device or untagged data that cannot be tagged by the device, as compared with other systems.

FIG. 1 is a flowchart illustrating a method for processing untagged data according to some embodiments of the present disclosure. As shown in FIG. 1, the method includes the following specific blocks.

In Block 101, similarity comparison is performed on a semantic vector of untagged data and a semantic vector of each piece of tagged data to obtain similarities corresponding to respective pieces of tagged data.

In Block 102, a preset number of similarities are selected according to a preset selection rule.

In Block 103, the untagged data is predicted by use of a tagging model obtained by training through the tagged data, to obtain a prediction result of the untagged data.

In Block 104, the untagged data is divided into untagged data that can be tagged by a device or untagged data that cannot be tagged by the device according to the preset number of similarities and the prediction result.

Herein, the tagged data may be a statement in which a knowledge point has been untagged in a scenario such as an intelligent voice dialog or a text dialog, and the untagged data may be a statement in which no knowledge point is tagged in the scenario such as the intelligent voice dialog or the text dialog. For example, in a question answering system scenario, tagged data may be a tagged user query, and the untagged data may be an untagged user query, and a tagging result may be a knowledge point corresponding to the user query.

Similarity comparison may be performed on the semantic vector of the untagged data and semantic vectors of multiple pieces of existing tagged data to obtain multiple similarities corresponding to the tagged data.

The preset selection rule may be determined according to magnitudes of the similarities, and screening the preset number of similarities from the multiple similarities may improve processing efficiency of subsequent processing.

Prediction may be performed to obtain the prediction result of the untagged data by use of a supervised learning model obtained by training through the tagged data.

The preset number of similarities and the prediction result are combined as measurement references to measure feasibility of tagging the untagged data by use of tagging results of the tagged data, thereby improving accuracy of distinguishing the untagged data that can be tagged by the device or the untagged data that cannot be tagged by the device.

Before the semantic vectors of the tagged data and the untagged data are calculated, duplication elimination processing may further be performed to reduce a data volume and improve a data processing speed and efficiency.

In some embodiments, the operation that the preset number of similarities are selected according to the preset selection rule includes: the preset number of similarities are selected from the obtained similarities corresponding to respective pieces of tagged data according to a descending order of the similarities.

Herein, selecting the similarities according to a descending order of the similarities may screen the tagged data with higher relevance with the untagged data and may provide more accurate reference data for distinguishing the untagged data that can be tagged by the device or the untagged data that cannot be tagged by the device.

In some embodiments, the operation that the untagged data is divided into the untagged data that can be tagged by the device or the untagged data that cannot be tagged by the device according to the preset number of similarities and the prediction result includes: when a statistical value of the preset number of similarities reaches a preset similarity threshold value, and, when the total number of tagging results, which are same as the prediction result, of the tagged data corresponding to all the similarities among the preset number of similarities reaches a preset equal number threshold value, the untagged data is determined as the untagged data that can be tagged by the device; otherwise, the untagged data is determined as the untagged data that cannot be tagged by the device.

Each similarity in the preset number of similarities corresponds to the tagging result of a piece of tagged data, and the similarity may be determined as confidence of the corresponding tagging result.

The statistical value may be a maximum value, minimum value, arithmetic average value and the like of the preset number of similarities. The statistical value of the preset number of similarities may be compared with the preset similarity threshold value to determine overall confidence or maximum confidence, etc. of each tagging result corresponding to the preset number of similarities.

The statistical value may be compared with the preset similarity threshold value at first to determine the overall confidence or maximum confidence, etc. of the tagging results corresponding to the preset number of similarities.

Then, the tagging results corresponding to all the similarities among the preset number of similarities are compared with the prediction result to obtain the number of the tagging results, which are same as the prediction result, corresponding to all the similarities respectively. For example, the tagging results corresponding 10 similarities are compared with the prediction result to obtain 5 tagging results that are same as the prediction result.

Reliability of tagging of the untagged data by the device may be determined according to the two comparisons.

If the statistical value reaches the preset similarity threshold value and the total number of the tagging results that are same as the prediction result reaches the preset equal number threshold value, it is determined that the reliability of tagging of the untagged data by the device is relatively high and the untagged data can be tagged by the device.

If the statistical value does not reach the preset similarity threshold value and/or the total number of the tagging results that are same as the prediction result does not reach the preset equal number threshold value, it is determined that the reliability of tagging of the untagged data by the device is not so high and the untagged data cannot be tagged by the device and is required to be tagged manually.

An association degree between the tagged data and the untagged data may be determined in combination with the similarities and the number of the tagging results that are same as the prediction result, and tagging confidence of the untagged data is determined through the confidence of the multiple tagging results, so that the accuracy of distinguishing tagging of the untagged data is improved.

For example, the preset number of similarities includes 10 similarities, the similarity average value is taken as the statistical value, the preset similarity threshold value is 0.9, and the preset equal number threshold value is 5.

If the average value of the preset number of similarities is 0.95, namely greater than the preset similarity threshold value, and six in the tagging results corresponding to the 10 similarities are same as the prediction result, namely greater than the preset equal number threshold value, it is determined that the untagged data is the untagged data that can be tagged by the device.

If the average value of the preset number of similarities is 0.89, namely less than the preset similarity threshold value, or four in the tagging results corresponding to the 10 similarities are same as the prediction result, namely less than the preset equal number threshold value, it is determined that the untagged data is the untagged data that cannot be tagged by the device.

During a practical application, an indexing manner may be adopted to determine the corresponding tagged data according to the similarities. Data in the form of "<user query>\t<knowledge point>" is arranged at first in a dialog system by use of supervised information, i.e., the tagged data, and after duplication elimination, a user query vector is calculated in combination with an unsupervised method. Herein, the user query is the tagged data, and the knowledge point is a tagging result of the tagged data. Two indexes are created for the semantic vector of the user query and corresponding knowledge point information by use of a query Identifier (ID) index corresponding to the user query. A first type of index is a tagging result index of which a key value is a query ID index and an index value is a tagging result corresponding to the user query. A second type of index is a semantic index of which a key value is the query ID index and an index value is the semantic vector of the user query. A tagging result index library and a semantic index library are obtained accordingly.

In the untagged data, a user query vector of the untagged data is also calculated by use of the unsupervised method. For the user query vector of each piece of untagged data, the semantic index library is queried to obtain K similar user query ID indexes with a maximum similarity, and then the tagging result indexes are queried for the corresponding tagging results by use of the K similar user query ID indexes with the maximum similarity, each tagging result corresponding to a similarity, to obtain K tagging results with the maximum similarity. K is the preset number, may be determined according to a practical condition such as the total number of untagged data samples, and is valued to be 3-20, for example, 3, 5 and 10.

Finally, whether to tag the untagged data by use of the device or manually tag the untagged data is determined according to the K tagging results and the corresponding confidence, i.e., the corresponding similarities. A confidence determination threshold value may be configured according to the practical condition.

In some embodiments, when the untagged data is determined as the untagged data that can be tagged by the device, the method further includes that: the untagged data is tagged by use of the tagging result of the tagged data corresponding to a maximum similarity among the preset number of similarities; or, first tagging results of first tagged data corresponding to the preset number of similarities respectively are determined, the total number of the first tagging results that are same as the prediction result is determined, and when the total number reaches the preset equal number threshold value, the untagged data is tagged by use of the prediction result.

Herein, the untagged data can be tagged by the device. The untagged data can be tagged by use of the tagging result with the maximum confidence, i.e., the tagging result corresponding to the maximum similarity. In such a manner, tagging the untagged data by use of the tagging result with the maximum confidence may improve tagging accuracy.

Or, the tagging results that are same as the prediction result are selected from the tagging results of the tagged data corresponding to all the similarities among the preset number of similarities, and if the total number of the tagging results that are same as the prediction result reaches the preset equal number threshold value, the untagged data is tagged by use of the tagging results that are same as the prediction result. Tagging the untagged data by use of the tagging result with a relatively high probability may also improve the tagging accuracy.

In some embodiments, the statistical value of the preset number of the similarities includes: the maximum similarity among the preset number of similarities, and/or, an average similarity of the preset number of similarities.

Herein, the similarity between the semantic vector of the tagged data and the semantic vector of the untagged data may be determined through the statistical value of the similarities from multiple aspects. For example, the tagged closest to the untagged data semantically is determined through the maximum similarity, and an overall semantic similarity between the tagged data corresponding to the preset number of similarities and the untagged data may be determined through the average similarity, so that a measurement standard is provided for selecting the tagging result to tag the untagged data.

The preset similarity threshold value compared with the maximum similarity may be 0.95, and the preset similarity threshold value compared with the average similarity may be 0.90.

In some embodiments, the operation that similarity comparison is performed on the semantic vector of the untagged data and the semantic vector of each piece of tagged data includes that: a word vector average value of the untagged data is compared with a word vector average value of each piece of tagged data, or, an LSTM prediction result of the untagged data is compared with an LSTM prediction result of each piece of tagged data.

For calculation of the word vector average value of the user query, i.e., the tagged data, or the word vector average value of the untagged data, a vector representation of each word in the user query may be calculated at first. If a dictionary size is V and a word vector dimension is d, a word vector of an ith word is $v_i \in i^d$. Then, the word vector average value is calculated. If there are n words in the tagged data or the untagged data, a word vector average is $$\frac{\sum_{i=1}^{n} v_i}{n}.$$

An LSTM unit structure in an LSTM method may be defined, and a corresponding LSTM prediction result of the tagged data or the untagged data, for example, a prediction result of the last word in the user query, is extracted as a semantic index result.

In some embodiments, the operation that the similarities corresponding to respective pieces of tagged data is obtained includes that: cosine similarities corresponding to respective pieces of tagged data are obtained; or Euclid similarities corresponding to respective pieces of tagged data are obtained.

Specifically, when similarity comparison is performed on the semantic vector of the untagged data and the semantic vector of each piece of tagged data, cosine similarity and Euclid similarity comparison may be performed. The cosine similarity may be calculated through formula (1):

$$\cos(i, j) = \frac{v_i^T g v_j}{\sqrt{\sum_{k=1}^{d} v_i^{k2}} g \sqrt{\sum_{l=1}^{d} v_j^{l2}}}. \quad (1)$$

The Euclid similarity may be calculated through formula (2):

$$\cos(i,j) = \sqrt{\sum_{k=1}^{d} |v_i^k - v_j^k|^2} \quad (2).$$

In formula (1) or formula (2), $v_i$ and $v_j$ represent the two semantic vectors that are compared, and d represents the word vector dimension.

A specific example will be provided below in combination with the abovementioned embodiment.

Figure 2:
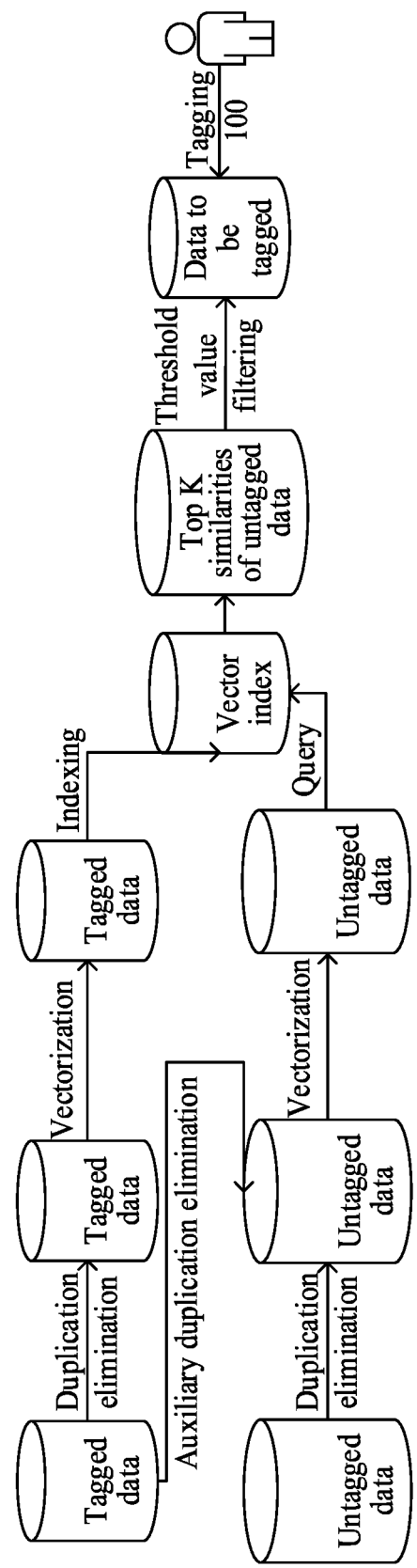
FIG. 2 is a detailed block diagram of a method for processing untagged data according to some embodiments of the present disclosure.

A direct relation is established between tagged data and untagged data. An active learning method is adopted, so that tagging efficiency and accuracy are improved. The whole flow is shown in FIG. 2.

The relation between the tagged data and the untagged data is established by use of semantic indexes. Unlike a conventional word-matching-based method such as a tf-idf or BM25-based method, a semantic vector may be taken as an index element and semantic relevance may be captured in a query process. For example, an index A "What if the mobile phone is broken" is stored, and when the user query is "The mobile phone is out of order," only a relationship between the user query and the index A may be established by tf-idf or BM25 through "mobile phone," but a relation may be established between "broken" and "out of order" through semantic indexes, so as to query information of the index A.

Data in the form of "<user query>\t<knowledge point>" is arranged at first in a dialog system by use of supervised information, i.e., the tagged data, and after duplication elimination, a semantic vector of the user query vector is calculated in combination with an unsupervised method. The semantic vector of the user query may be calculated by many methods, and in an experiment, word vector average and LSTM methods may be adopted.

For the tagged data, two indexes are created for a query ID index and corresponding knowledge point information. A first type of index is a tagging result index of which a key value is a query ID index and an index value is a tagging result corresponding to the user query, and a tagging result index library is established. A second type of index is a semantic index of which a key value is the query ID index and an index value is the semantic vector of the user query, and a semantic index library is established.

For the untagged data, the user query vector is also calculated by use of the unsupervised method, and a user query semantic vector of each piece of untagged data is calculated.

The semantic index library is queried for the user query semantic vector of the untagged data to obtain top K similar user query IDs with a maximum similarity. A similarity measurement method may adopt cosine similarity and Euclid similarity methods, etc.

Then, the tagging result index library is queried for corresponding tagging results by use of the top K similar user query IDs, each tagging result corresponding to a similarity score. It is determined whether to tag the untagged data according to confidence, i.e., the similarity. A confidence determination standard may be configured.

In a semantic index creation process, the word vector average and LSTM methods are adopted. According to the word vector method, a vector representation of each word in the user query may be calculated at first. If a dictionary size is V and a word vector dimension is d, a word vector of an ith word is $v_i \in i^d$. Then, a word vector average value is calculated. If there are n words in the tagged data or the untagged data, a word vector average is $$\frac{\sum_{i=1}^{n} v_i}{n}.$$

An LSTM unit structure is defined in the LSTM method, and a prediction result of the last word in the user query is extracted as a semantic index result.

Specifically, when similarity comparison is performed on the semantic vector of the untagged data and the semantic vector of each piece of tagged data, cosine similarity and Euclid similarity comparison may be performed. The cosine similarity may be calculated through formula (1), and the Euclid similarity may be calculated through formula (2).

After the tagging results corresponding to the top K similarities are screened, samples to be tagged are filtered by use of the maximum similarity and an average value of the top K similarities, and if the maximum similarity of the average value of the top K similarities are lower than a certain threshold value, they are added into a set of samples to be manually tagged.

Herein, a same number of samples to be tagged are screened from two sets of data to be untagged by use of five methods including a random strategy, word vector average+cosine similarity, LSTM+cosine similarity, word vector average+Euclidean distance and LSTM+Euclidean distance respectively, and statistics is made by manual tagging to obtain a difference between a manual tagging result of the untagged data that cannot be tagged by a device and a device tagging result of the untagged data that can be tagged by the device. A greater difference indicates that a better distinguishing effect of distinguishing the untagged data that can be tagged by the device and cannot be tagged by the device. If the same number of samples to be tagged that are screened include N samples to be tagged and M samples to be tagged have tagging results different from a semantic index retrieval result, the difference is defined as $$\frac{M}{N}.$$

A specific result is shown in Table 1. From Table 1, it may be seen that the difference in the method of the embodiment of the present disclosure is better than a difference in the random strategy.

TABLE 1

|  | Dataset 1 | Dataset 2 |
| --- | --- | --- |
| Random strategy | 0.37 | 0.42 |
| Word vector average + cosine similarity | 0.51 | 0.49 |
| LSTM + cosine similarity | 0.48 | 0.47 |
| Word vector average + Euclidean distance | 0.43 | 0.47 |
| LSTM + Euclidean distance | 0.48 | 0.5 |

Figure 3:
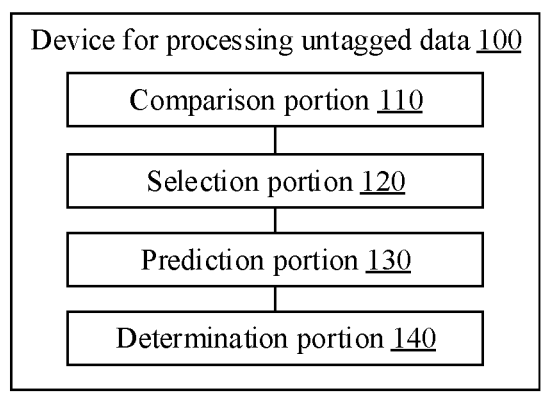
FIG. 3 is a block diagram of a device for processing untagged data according to some embodiments of the present disclosure.

FIG. 3 is a block diagram of a device 100 for processing untagged data according to some embodiments of the present disclosure. Referring to FIG. 2, the device includes a comparison portion 110, a selection portion 120, a prediction portion 130 and a determination portion 140.

The comparison portion 110 is configured to perform similarity comparison on a semantic vector of untagged data and a semantic vector of each piece of tagged data to obtain similarities corresponding to respective pieces of tagged data.

The selection portion 120 is configured to select a preset number of similarities according to a preset selection rule.

The prediction portion 130 is configured to predict the untagged data by use of a tagging model obtained by training through the tagged data, to obtain a prediction result of the untagged data.

The determination portion 140 is configured to divide the untagged data into untagged data that can be tagged by a device or untagged data that cannot be tagged by the device according to the preset number of similarities and the prediction result.

Figure 4:
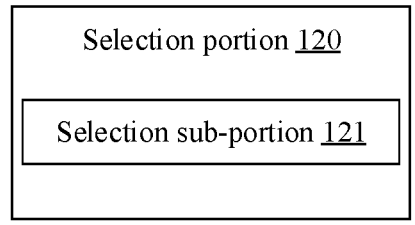
FIG. 4 is a block diagram of another device for processing untagged data according to some embodiments of the present disclosure.

In some embodiments, as shown in FIG. 4, the selection portion 120 includes:

a prediction sub-portion 121 configured to select the preset number of similarities from the obtained similarities corresponding to respective pieces of tagged data according to a descending order of the similarities.

Figure 5:
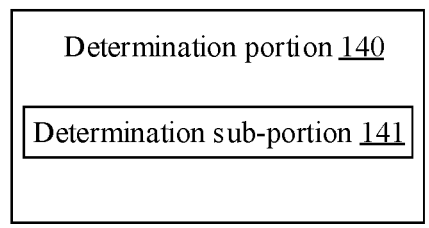
FIG. 5 is a block diagram of yet another device for processing untagged data according to some embodiments of the present disclosure.

In some embodiments, as shown in FIG. 5, the determination portion 140 includes a determination sub-portion 141.

The determination sub-portion 141 is configured to: when a statistical value of the preset number of similarities reaches a preset similarity threshold value and when the total number of tagging results, which are same as the prediction result, of the tagged data corresponding to all the similarities among the preset number of similarities reaches a preset equal number threshold value, determine the untagged data as the untagged data that can be tagged by the device; otherwise, determine the untagged data as the untagged data that cannot be tagged by the device.

Figure 6:
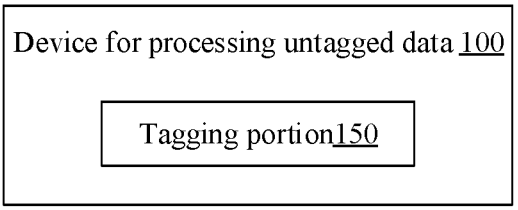
FIG. 6 is a block diagram of still another device for processing untagged data according to some embodiments of the present disclosure.

In some embodiments, as shown in FIG. 6, the device 100 further includes a tagging portion 150.

The tagging portion 150 configured to: when the untagged data is determined as the untagged data that can be tagged by the device, tag the untagged data by use of the tagging result of the tagged data corresponding to a maximum similarity among the preset number of similarities; or, determine first tagging results of first tagged data corresponding to the preset number of similarities respectively, determine the total number of the first tagging results that are same as the prediction result, and when the total number reaches the preset equal number threshold value, tag the untagged data by use of the prediction result.

In some embodiments, the statistical value of the preset number of the similarities includes: the maximum similarity among the preset number of similarities, and/or, an average similarity of the preset number of similarities.

Figure 7:
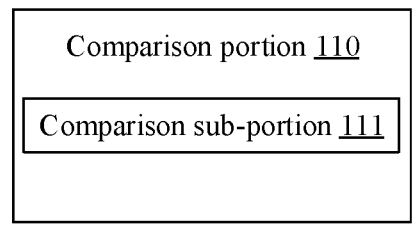
FIG. 7 is a block diagram of still another device for processing untagged data according to some embodiments of the present disclosure.

In some embodiments, as shown in FIG. 7, the comparison portion 110 includes a comparison sub-portion 111.

The comparison sub-portion 111 is configured to compare a word vector average value of the untagged data and a word vector average value of each piece of tagged data, or, compare an LSTM prediction result of the untagged data and an LSTM prediction result of each piece of tagged data.

In some embodiments, the similarities corresponding to respective pieces of tagged data includes: cosine similarities corresponding to respective pieces of tagged data; or Euclid similarities corresponding to respective pieces of tagged data.

With respect to the device in the above embodiment, the specific manners for performing operations for individual portions therein have been described in detail in the embodiment regarding the method, which will not be elaborated herein.

Figure 8:
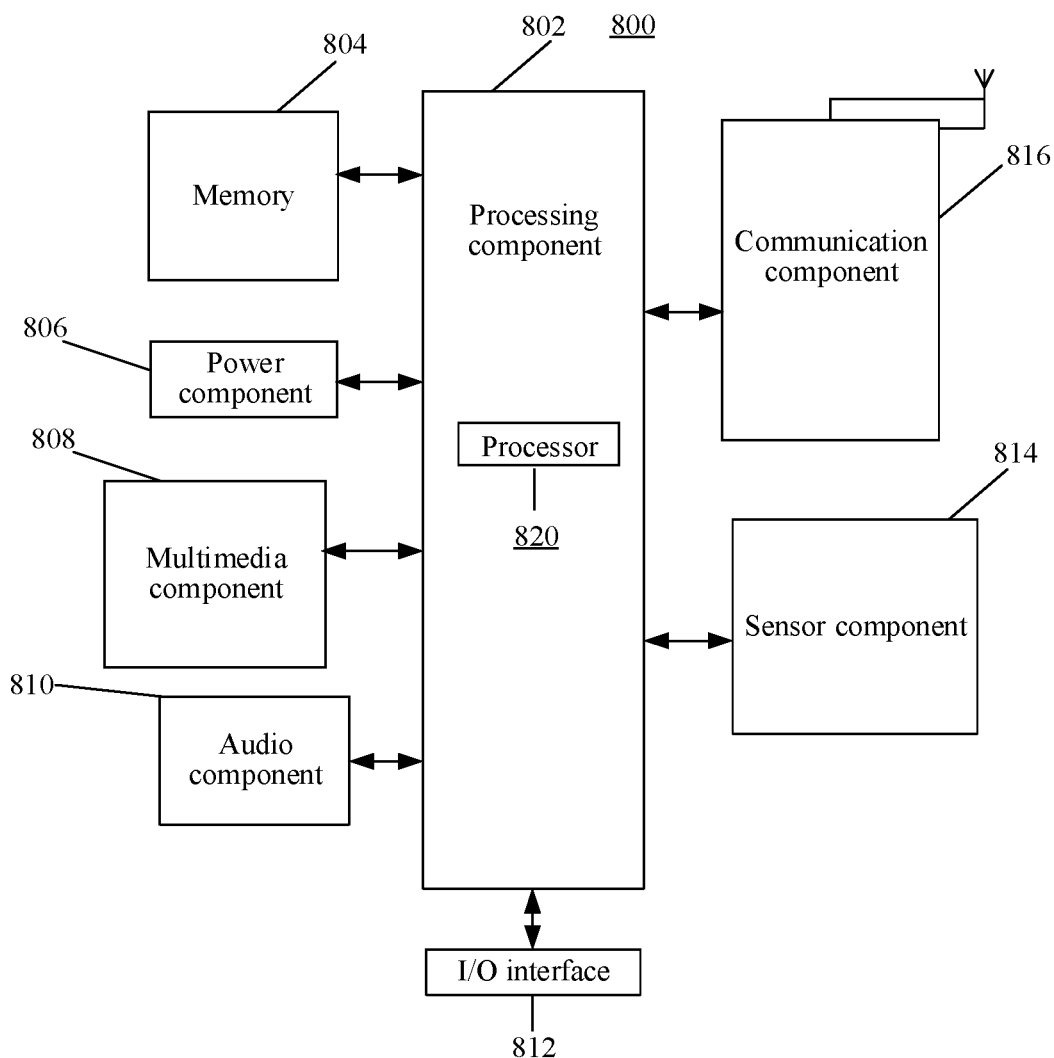
FIG. 8 is a block diagram of yet another device for processing untagged data according to some embodiments of the present disclosure.

FIG. 8 is a block diagram of a device 800 for processing untagged data according to some embodiments of the present disclosure. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the blocks in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). In some embodiments, the screen can include an organic light-emitting diode (OLED) display or other types of displays. The display screen can perform one or more operations of the methods described above, such as displaying an intermediate and/or final result to a user.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 816 receives a broadcast signal or broadcast associated information from an external broadcast management system through a broadcast channel. In some embodiments of the present disclosure, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Compact Disc Read-Only Memory (CD-ROM), a magnetic tape, a floppy disc, an optical data storage device and the like.

A non-transitory computer-readable storage medium can have instructions stored thereon, which are executable by a processor of a mobile terminal to enable the mobile terminal to execute a method for processing untagged data, methods including the blocks described above.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for processing untagged data, comprising:
performing similarity comparison on a semantic vector of untagged data and a semantic vector of each piece of tagged data to obtain similarities corresponding to respective pieces of tagged data;
selecting a preset number of similarities according to a preset selection rule;
predicting the untagged data with a tagging model obtained by training through the tagged data, to obtain a prediction result of the untagged data; and
dividing the untagged data into untagged data that can be tagged by a device or untagged data that cannot be tagged by the device according to the preset number of similarities and the prediction result,
wherein the performing similarity comparison on the semantic vector of the untagged data and the semantic vector of each piece of tagged data comprises:
comparing a word vector average value of the untagged data and a word vector average value of each piece of tagged data; or
comparing a Long Short Term Memory (LSTM) prediction result of the untagged data and an LSTM prediction result of each piece of tagged data.

2. The method of claim 1, wherein the selecting the preset number of similarities according to the preset selection rule comprises:
selecting the preset number of similarities from the obtained similarities corresponding to respective pieces of tagged data according to a descending order of the similarities.

3. The method of claim 1, wherein the dividing the untagged data into the untagged data that can be tagged by the device or the untagged data that cannot be tagged by the device according to the preset number of similarities and the prediction result comprises:
when a statistical value of the preset number of similarities reaches a preset similarity threshold value, and when a total number of tagging results, which are same as the prediction result, of the tagged data corresponding to all the similarities among the preset number of similarities reaches a preset equal number threshold value, determining the untagged data as the untagged data that can be tagged by the device;
otherwise, determining the untagged data as the untagged data that cannot be tagged by the device.

4. The method of claim 1, further comprising: responsive to that the untagged data is determined as the untagged data that can be tagged by the device,
tagging the untagged data by use of a tagging result of the tagged data corresponding to a maximum similarity among the preset number of similarities; or
determining first tagging results of first tagged data corresponding to the preset number of similarities respectively,
determining a total number of the first tagging results that are same as the prediction result, and
responsive to that the total number reaches a preset equal number threshold value, tagging the untagged data by use of the prediction result.

5. The method of claim 3, wherein the statistical value of the preset number of similarities comprises at least one of:
a maximum similarity among the preset number of similarities, or an average similarity of the preset number of similarities.

6. The method of claim 1, wherein the obtaining the similarities corresponding to respective pieces of tagged data comprises:
obtaining cosine similarities corresponding to the respective pieces of tagged data; or
obtaining Euclid similarities corresponding to the respective pieces of tagged data.

7. A device for processing untagged data, comprising:
a processor; and
a memory storing instructions executable by the processor,
wherein the processor is configured to:
perform similarity comparison on a semantic vector of untagged data and a semantic vector of each piece of tagged data to obtain similarities corresponding to respective pieces of tagged data;
select a preset number of similarities according to a preset selection rule;
predict the untagged data by use of a tagging model obtained by training through the tagged data, to obtain a prediction result of the untagged data; and
divide the untagged data into untagged data that can be tagged by a device or untagged data that cannot be tagged by the device according to the preset number of similarities and the prediction result,
wherein to perform similarity comparison on the semantic vector of the untagged data and the semantic vector of each piece of tagged data, the processor is configured to:
compare a word vector average value of the untagged data and a word vector average value of each piece of tagged data; or compare a Long Short Term Memory (LSTM) prediction result of the untagged data and an LSTM prediction result of each piece of tagged data.

8. The device of claim 7, wherein to select the preset number of similarities according to the preset selection rule, the processor is configured to:
select the preset number of similarities from the obtained similarities corresponding to respective pieces of tagged data according to a descending order of the similarities.

9. The device of claim 7, wherein to divide the untagged data into the untagged data that can be tagged by the device or the untagged data that cannot be tagged by the device according to the preset number of similarities and the prediction result, the processor is configured to:
when a statistical value of the preset number of similarities reaches a preset similarity threshold value and when the total number of tagging results, which are same as the prediction result, of the tagged data corresponding to all the similarities among the preset number of similarities reaches a preset equal number threshold value, determine the untagged data as the untagged data that can be tagged by the device; otherwise, determine the untagged data as the untagged data that cannot be tagged by the device.

10. The device of claim 7, wherein responsive to that the untagged data is determined as the untagged data that can be tagged by the device, the processor is further configured to:
responsive to that the untagged data is determined as the untagged data that can be tagged by the device, tag the untagged data by use of a tagging result of the tagged data corresponding to a maximum similarity among the preset number of similarities; or
determine first tagging results of first tagged data corresponding to the preset number of similarities respectively,
determine a total number of the first tagging results that are same as the prediction result, and
responsive to that the total number reaches a preset equal number threshold value, tag the untagged data by use of the prediction result.

11. The device of claim 9, wherein the statistical value of the preset number of similarities comprises at least one of:
a maximum similarity among the preset number of similarities, or an average similarity of the preset number of similarities.

12. The device of claim 7, wherein to obtain the similarities corresponding to respective pieces of tagged data, the processor is configured to:
obtain cosine similarities corresponding to respective pieces of tagged data; or
obtain Euclid similarities corresponding to respective pieces of tagged data.

13. A non-transitory storage medium having stored thereon computer-readable instructions that, when executed by a processor, cause the processor to implement operations of a method for processing untagged data, the method including: performing similarity comparison on a semantic vector of untagged data and a semantic vector of each piece of tagged data to obtain similarities corresponding to respective pieces of tagged data;
selecting a preset number of similarities according to a preset selection rule;
predicting the untagged data with a tagging model obtained by training through the tagged data, to obtain a prediction result of the untagged data; and
dividing the untagged data into untagged data that can be tagged by a device or untagged data that cannot be tagged by the device according to the preset number of similarities and the prediction result,
wherein the performing similarity comparison on the semantic vector of the untagged data and the semantic vector of each piece of tagged data comprises:
comparing a word vector average value of the untagged data and a word vector average value of each piece of tagged data; or
comparing a Long Short Term Memory (LSTM) prediction result of the untagged data and an LSTM prediction result of each piece of tagged data.

14. The non-transitory storage medium of claim 13, wherein selecting the preset number of similarities according to the preset selection rule comprises:
selecting the preset number of similarities from the obtained similarities corresponding to respective pieces of tagged data according to a descending order of the similarities.

15. The non-transitory storage medium of claim 13, wherein dividing the untagged data into the untagged data that can be tagged by the device or the untagged data that cannot be tagged by the device according to the preset number of similarities and the prediction result comprises:
when a statistical value of the preset number of similarities reaches a preset similarity threshold value, and when a total number of tagging results, which are same as the prediction result, of the tagged data corresponding to all the similarities among the preset number of similarities reaches a preset equal number threshold value, determining the untagged data as the untagged data that can be tagged by the device;
otherwise, determining the untagged data as the untagged data that cannot be tagged by the device.

16. The non-transitory storage medium of claim 13, wherein the method further comprises: when the untagged data is determined as the untagged data that can be tagged by the device,
tagging the untagged data by use of a tagging result of the tagged data corresponding to a maximum similarity among the preset number of similarities; or
determining first tagging results of first tagged data corresponding to the preset number of similarities respectively,
determining a total number of the first tagging results that are same as the prediction result, and
when the total number reaches a preset equal number threshold value, tagging the untagged data by use of the prediction result.

17. The non-transitory storage medium of claim 15, wherein the statistical value of the preset number of similarities comprises at least one of:
a maximum similarity among the preset number of similarities, or an average similarity of the preset number of similarities.

18. The non-transitory storage medium of claim 13, wherein the obtaining the similarities corresponding to respective pieces of tagged data comprises:
obtaining cosine similarities corresponding to the respective pieces of tagged data; or
obtaining Euclid similarities corresponding to the respective pieces of tagged data.

* * * * *